M. W. KNOX.
Potato-Digger.
No. 160,776.
Patented March 16, 1875.
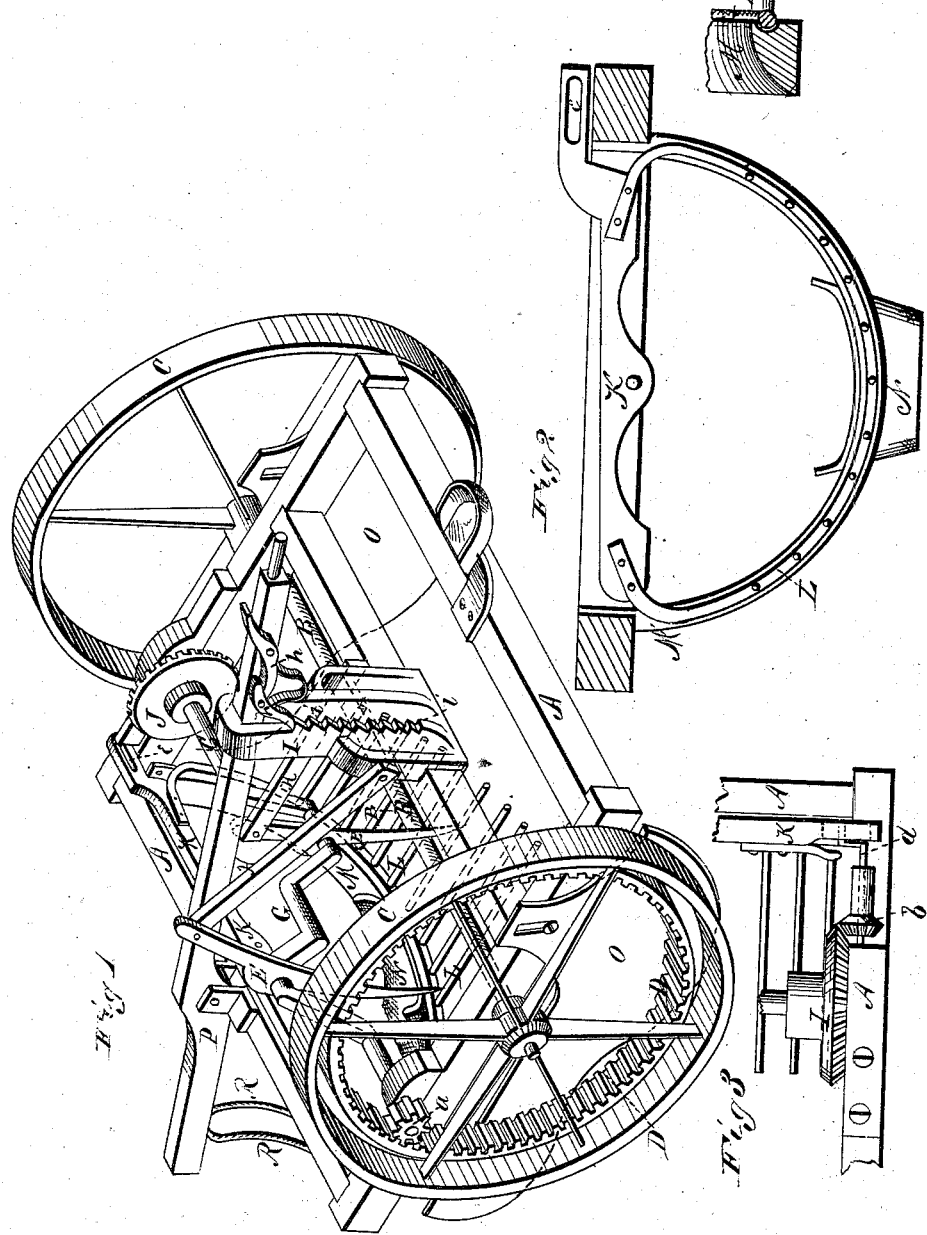
Witnesses:
Franck L. Ourand
Aib Mulver
Inventor:
M. W. Knox,
per
C. H. Watson & Co. Atty's

UNITED STATES PATENT OFFICE.

MELVIN W. KNOX, OF SHERIDAN, NEW YORK.

IMPROVEMENT IN POTATO-DIGGERS.

Specification forming part of Letters Patent No. 160,776, dated March 16, 1875; application filed February 16, 1875.

*To all whom it may concern:*

Be it known that I, MELVIN W. KNOX, of Sheridan, in the county of Chautauqua and State of New York, have invented certain new and useful Improvements in Potato-Diggers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a potato-digger, as will be hereinafter more fully set forth.

In the annexed drawing, Figure 1 is perspective view of a device embodying my invention, and Figs. 2 and 3 are details of the same.

A represents a rectangular frame, of any suitable dimensions, secured on the axle B, on the ends of which are placed the driving-wheels C C. On the inner side of one of the wheels C is secured a cogged rim, D, having the cogs along its inner surface, which gears with a pinion, $a$, on one end of a double crank-shaft, G, having its bearings on the frame A in front of the axle. The two cranks of the shaft G are set in opposite directions, as shown, and on each crank is placed a finger, E, to the upper end of which is pivoted a bar, H, the other end of said arm being pivoted to a frame, I, attached to a cross-bar in the frame A in rear of the axle. This forms, as it were, a jointed finger, operated by the revolution of the crank-shaft G, to clear vines and other obstructions from the riddle or shaker under the front end of the main frame. At the other end of the crank-shaft G is a miter-wheel, J, which gears with a miter-pinion, $b$, on a short shaft, that has a crank, $d$, at its front end. This crank enters a slot, $e$, in the extended end of an oscillating arm, K, pivoted in the center of the front cross-bar of the main frame. To this arm are attached or connected the ends of the semicircular riddle or shaker L, so that the same will obtain a vibrating motion direct from the crank $d$. The riddle or shaker L moves in a groove on the back of a semicircular guard, M, having its ends attached to the main frame, and in the center of which is secured the scoop N. To the outer side, at each end of the guard M, is pivoted a side guard, O, which extends along the side of the main frame A, and is adjustable up and down thereon by means of a slot and screw, as shown.

These side guards are for the purpose of preventing the vines from clogging the gearing and wheels, and also for preventing the potatoes from spreading over the ground, and leaving them in a row.

P represents the tongue, pivoted on top of the front cross-bar of the main frame A, between suitable ears or standards thereon. On the under side of the tongue, a suitable distance in front of the frame, are attached hooks R R, which, in a full-sized machine, are to have a hinged joint at the front end, and farther back be supported at the proper height for straightening the vines before the scoop or shovel N and vibrating riddle or shaker L.

Some fields of potatoes may be hilled very high, and others quite low, and the hooks should pass as near the ground as possible. Therefore, in a full-sized machine, these hooks should be made capable of adjustment up and down as described.

The rear end of the tongue passes through the frame, forming a lever, which is provided with a spring-pawl, $h$, to take into a rack, $i$, formed on the back of said frame, whereby the scoop may be raised and lowered, as desired, and held at the proper height from the ground.

Having thus fully described my invention, what I claim as new, and desire to secure by Letters Patent, is—

1. The adjustable side guards O, arranged in combination with the main frame A of a potato-digger, substantially as and for the purpose described.

2. The tongue P, provided with hooks R R, and pivoted to the frame A, in combination with spring-pawl $h$, frame I with rack $i$, and main frame A, supporting the potato-digging apparatus, as and for the purpose specified.

3. The semicircular riddle or shaker L and oscillating arm K, having one end extended and provided with slot $e$, in combination with the double crank-shaft G, bevel-gears J $b$, cogged rim D, and jointed fingers E H, all as and for the purpose set forth.

In testimony that I claim the foregoing as my own I affix my signature in presence of two witnesses.

MELVIN W. KNOX.

Witnesses:
 A. W. POPPLE,
 A. R. SELLEW.